US011470670B2

(12) United States Patent
Chen et al.

(10) Patent No.: US 11,470,670 B2
(45) Date of Patent: Oct. 11, 2022

(54) BEAM FAILURE RECOVERY METHOD AND USER EQUIPMENT

(71) Applicant: CHINA ACADEMY OF TELECOMMUNICATIONS TECHNOLOGY, Beijing (CN)

(72) Inventors: Li Chen, Beijing (CN); Pierre Bertrand, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 116 days.

(21) Appl. No.: 16/968,762

(22) PCT Filed: Jan. 31, 2019

(86) PCT No.: PCT/CN2019/074181
§ 371 (c)(1),
(2) Date: Aug. 10, 2020

(87) PCT Pub. No.: WO2019/154272
PCT Pub. Date: Aug. 15, 2019

(65) Prior Publication Data
US 2021/0014920 A1    Jan. 14, 2021

(30) Foreign Application Priority Data
Feb. 12, 2018   (CN) .................. 201810146147.X

(51) Int. Cl.
*H04W 76/18*     (2018.01)
*H04W 76/19*     (2018.01)
(Continued)

(52) U.S. Cl.
CPC .......... *H04W 76/18* (2018.02); *H04B 7/0695* (2013.01); *H04W 72/046* (2013.01);
(Continued)

(58) Field of Classification Search
USPC ........................................................ 375/262
See application file for complete search history.

(56) References Cited

U.S. PATENT DOCUMENTS

2014/0198696 A1    7/2014   Li et al.
2016/0330766 A1    11/2016   Liu et al.
(Continued)

FOREIGN PATENT DOCUMENTS

CN     101400129 A     4/2009
CN     101483924 A     7/2009
(Continued)

OTHER PUBLICATIONS

Communication pursuant to Article 94(3) EPC dated Oct. 18, 2021 in European Patent Application No. 19 750 254.5.
(Continued)

*Primary Examiner* — Sam K Ahn
*Assistant Examiner* — Gina M McKie
(74) *Attorney, Agent, or Firm* — Harness, Dickey & Pierce, P.L.C.

(57) ABSTRACT

The present disclosure provides a beam failure recovery method and a UE. The beam failure recovery method includes: performing beam failure recovery using non-contention-based random access; and performing the beam failure recovery using contention-based random access in the case that the non-contention-based random access fails.

14 Claims, 3 Drawing Sheets

(51) Int. Cl.
  *H04B 7/06* (2006.01)
  *H04W 72/04* (2009.01)
  *H04W 74/00* (2009.01)
  *H04W 74/04* (2009.01)
  *H04W 74/08* (2009.01)

(52) U.S. Cl.
  CPC ......... *H04W 74/008* (2013.01); *H04W 74/04* (2013.01); *H04W 74/0833* (2013.01); *H04W 76/19* (2018.02)

(56) References Cited

U.S. PATENT DOCUMENTS

| | | | |
|---|---|---|---|
| 2018/0035470 | A1 | 2/2018 | Chen et al. |
| 2018/0324653 | A1* | 11/2018 | Nagaraja ........... H04W 36/0044 |
| 2018/0368126 | A1* | 12/2018 | Islam .................... H04L 5/0048 |
| 2019/0037423 | A1* | 1/2019 | Yu ............................ H04B 7/06 |
| 2019/0052337 | A1* | 2/2019 | Kwon ................. H04W 72/085 |

FOREIGN PATENT DOCUMENTS

| | | | |
|---|---|---|---|
| CN | 102685892 | A | 9/2012 |
| CN | 104780617 | A | 7/2015 |
| CN | 105191432 | A | 12/2015 |
| CN | 107666722 | A | 2/2018 |
| CN | 110139391 | A | 8/2019 |

OTHER PUBLICATIONS

Qualcomm Incorporated "Remaining details on beam recovery procedure," 3GPP TSG RAN WG1 Meeting AH 1801, R1-1800860, Jan. 22, 2018, Vancouver, Canada.
Chinese Office Action dated Nov. 24, 2020 for Chinese Application No. 201810146147.X.
Media Tek Inc., "Offline Summary for Remaining issues on Beam Failure Recovery", 3GPP TSG RAN WG1 Meeting #AH1801, R1-1801197, Jan. 22-26, 2018, Vancouver, CA.
Extended European Search Report dated Jan. 15, 2021 for application No. EP 19 75 0254.
Samsung (Rapporteur), "General corrections on TS 38.321", Change Request, 3GPP TSG-RAN WG2 NR Ad Hoc 1801, R2-1801546, Jan. 22-26, 2018, Vancouver, CA.
Qualcomm Incorporated, "Beam recovery procedures", 3GPP TSG-RAN WG1 NR#2, R1-1711161, Jun. 27-30, 2017, Qingdao, P.R. China.
Qualcomm Incorporated, "Beam recovery procedure", 3GPP TSG-RAN WG1 Meeting RAN1 #90bis, R1-1718542, Oct. 9-13, 2017, Prague, Czech Republic.
Media Tek Inc., "Summary for Remaining issues on Beam Failure Recovery", 3GPP TSG RAN WG1 Meeting #92, R1-1803311, Feb. 26-Mar. 2, 2018, Athens, Greece.
Huawei, HiSilicon, "CR on non-contention based random access for beam failure recovery", Change Request, 3GPP TSG-RAN WG2#AH-1801, R2-1081050, Jan. 22-26, 2018, Vancouver, Canada.
Qualcomm Incorporated, "Clarification on BFR timer", 3GPP TSG-RAN WG2 #101bis, R2-1805753, Apr. 16-20, 2018, Sanya, China.
Written Opinion and International Search report for International Application No. PCT/CN2019/074181 dated Aug. 27, 2020.

* cited by examiner

BEAM FAILURE RECOVERY METHOD AND USER EQUIPMENT

CROSS-REFERENCE TO RELATED APPLICATIONS

The present application is the U.S. national phase of PCT Application No. PCT/CN2019/074181 filed on Jan. 31, 2019, which claims a priority of the Chinese patent application No. 201810146147.X filed in China on Feb. 12, 2018, which are incorporated herein by reference in their entireties.

TECHNICAL FIELD

The present disclosure relates to the field of communications technology, in particular to a Beam Failure Recovery (BFR) method and a User Equipment (UE).

BACKGROUND

In a Fifth-Generation (5G) New Radio (NR) system, the transmission is performed widely in a beamforming mode. Signaling and data are transmitted by each of a UE and a base station on a determined beam. For the base station and the UE, there is a correspondence between reception beams and transmission beams. When the UE detects that channel quality of a beam on which the UE is currently operating is low, the UE may initiate a BFR process. In the BFR process, the UE may re-find a beam whose channel quality meets a predetermined requirement. To be specific, the UE selects new available Synchronous Signal Blocks (SSBs) or Channel State Information Reference Signals (CSI-RS s), and different SSBs or CSI-RS s correspond to respective different beams.

To be specific, the BFR process may be implemented through random access. The UE selects a specific beam to initiate the random access, and when the random access has been performed successfully, the UE determines that the BFR has been completed on the selected beam. The random access for the BFR may be non-contention-based random access or contention-based random access.

However, in the related art, when the UE selects the non-contention-based random access for the BFR and one random access process fails, the UE may continue to initiate a next random access process on the beam until the BFR has been performed successfully, or may determine that the BFR fails after the quantity of the non-contention-based random access processes for the BFR reach a maximum value. Hence, when the beam with relatively low quality is initially selected by the UE, a waste of a large quantity of random access resources may easily occur.

SUMMARY

An object of the present disclosure is to provide a BFR method and a UE, so as to reduce the waste of the random access resource in the BFR process, accelerate the BFR process, increase a success rate of the BFR, reduce the risk of a radio link failure for the UE, and further improve the data transmission efficiency.

In one aspect, the present disclosure provides in some embodiments a BFR method, including: performing BFR using non-contention-based random access; and performing the BFR using contention-based random access in the case that the non-contention-based random access fails.

In a possible embodiment of the present disclosure, the performing the BFR using the contention-based random access in the case that the non-contention-based random access fails includes: detecting channel quality of a beam for which a non-contention-based random access resource for the BFR has been configured in the case that the non-contention-based random access fails; and when the channel quality of the beam for which the non-contention-based random access resource for the BFR has been configured is smaller than a predetermined threshold, performing the BFR using the contention-based random access.

In a possible embodiment of the present disclosure, Msg1 initial received target power of the contention-based random access for the BFR is Msg1 initial received target power preconfigured for the contention-based random access, and/or an Msg1 power ramping step of the contention-based random access for the BFR is an Msg1 power ramping step preconfigured for the contention-based random access.

In a possible embodiment of the present disclosure, a maximum quantity of random access processes for determining that the BFR fails is one of: a maximum quantity of random access processes configured for the non-contention-based random access for the BFR, a maximum quantity of random access processes configured for the contention-based random access, a smaller one of the maximum quantity of random access processes configured for the non-contention-based random access for the BFR and the maximum quantity of random access processes configured for the contention-based random access, and a larger one of the maximum quantity of random access processes configured for the non-contention-based random access for the BFR and the maximum quantity of random access processes configured for the contention-based random access.

In a possible embodiment of the present disclosure, during the procedure of performing the BFR using the contention-based random access, the quantity of random access processes for initial contention-based random access is recorded as 1; or during the procedure of performing the BFR using the contention-based random access, the quantity of random access processes for the initial contention-based random access is recorded as a value acquired through incrementing the quantity of non-contention-based random access processes for the BFR before the contention-based random access by one.

In a possible embodiment of the present disclosure, during the procedure of performing the BFR using the contention-based random access, when current contention-based random access fails and a backoff indicator has been received, the BFR method further includes omitting the backoff indicator and re-initiating the contention-based random access on a latest random access resource; or during the procedure of performing the BFR using the contention-based random access, when the current contention-based random access fails and the backoff indicator has been received, the BFR method further includes re-initiating the contention-based random access after waiting for a period corresponding to the backoff indicator.

In another aspect, the present disclosure provides in some embodiments a UE, including: a first BFR module configured to perform BFR using non-contention-based random access; and a second BFR module configured to perform the BFR using contention-based random access in the case that the non-contention-based random access fails.

In a possible embodiment of the present disclosure, the second BFR module includes: a detection unit configured to detect channel quality of a beam for which a non-contention-based random access resource for the BFR has been configured in the case that the non-contention-based random access fails; and a BFR unit configured to, when the channel quality of the beam for which the non-contention-based random access resource for the BFR has been configured is smaller than a predetermined threshold, perform the BFR using the contention-based random access.

In a possible embodiment of the present disclosure, Msg1 initial received target power of the contention-based random access for the BFR is Msg1 initial received target power preconfigured for the contention-based random access, and/ or an Msg1 power ramping step of the contention-based random access for the BFR is an Msg1 power ramping step preconfigured for the contention-based random access.

In a possible embodiment of the present disclosure, a maximum quantity of random access processes for determining that the BFR fails is one of: a maximum quantity of random access processes configured for the non-contention-based random access for the BFR, a maximum quantity of random access processes configured for the contention-based random access, a smaller one of the maximum quantity of random access processes configured for the non-contention-based random access for the BFR and the maximum quantity of random access processes configured for the contention-based random access, and a larger one of the maximum quantity of random access processes configured for the non-contention-based random access for the BFR and the maximum quantity of random access processes configured for the contention-based random access.

In yet another aspect, the present disclosure provides in some embodiments a UE, including a transceiver, a memory, a processor, and a program stored in the memory and capable of being executed by the processor. The transceiver is configured to: perform BFR using non-contention-based random access; and perform the BFR using contention-based random access in the case that the non-contention-based random access fails.

In a possible embodiment of the present disclosure, the processor is configured to read the program stored in the memory, so as to detect channel quality of a beam for which a non-contention-based random access resource for the BFR has been configured in the case that the non-contention-based random access fails, and the transceiver is further configured to, when the channel quality of the beam for which the non-contention-based random access resource for the BFR has been configured is smaller than a predetermined threshold, perform the BFR using the contention-based random access.

In a possible embodiment of the present disclosure, Msg1 initial received target power of the contention-based random access for the BFR is Msg1 initial received target power preconfigured for the contention-based random access, and/ or an Msg1 power ramping step of the contention-based random access for the BFR is an Msg1 power ramping step preconfigured for the contention-based random access.

In a possible embodiment of the present disclosure, a maximum quantity of random access processes for determining that the BFR fails is one of: a maximum quantity of random access processes configured for the non-contention-based random access for the BFR, a maximum quantity of random access processes configured for the contention-based random access, a smaller one of the maximum quantity of random access processes configured for the non-contention-based random access for the BFR and the maximum quantity of random access processes configured for the contention-based random access, and a larger one of the maximum quantity of random access processes configured for the non-contention-based random access for the BFR and the maximum quantity of random access processes configured for the contention-based random access.

In a possible embodiment of the present disclosure, during the procedure of performing the BFR using the contention-based random access, the quantity of random access processes for initial contention-based random access is recorded as 1; or during the procedure of performing the BFR using the contention-based random access, the quantity of random access processes for the initial contention-based random access is recorded as a value acquired through incrementing the quantity of non-contention-based random access processes for the BFR before the contention-based random access by one.

In a possible embodiment of the present disclosure, the transceiver is further configured to: during the procedure of performing the BFR using the contention-based random access, when current contention-based random access fails and a backoff indicator has been received, omit the backoff indicator and re-initiate the contention-based random access on a latest random access resource; or during the procedure of performing the BFR using the contention-based random access, when the current contention-based random access fails and the backoff indicator has been received, re-initiate the contention-based random access after waiting for a period corresponding to the backoff indicator.

In still yet another aspect, the present disclosure further provides in some embodiments a computer-readable storage medium storing therein a program. The program is configured to be executed by a processor so as to implement steps of the above-mentioned BFR method.

According to the embodiments of the present disclosure, the BFR may be performed using the non-contention-based random access, and the BFR may be performed using the contention-based random access in the case that the non-contention-based random access fails. As a result, it is able to not only reduce a waste of the random access resource in the BFR process, but also accelerate the BFR implementation process, increase a success rate of the BFR, reduce the risk of a radio link failure for the UE, and further improve the data transmission efficiency.

DETAILED DESCRIPTION

In order to make the objects, the technical solutions and the advantages of the present disclosure more apparent, the present disclosure will be described hereinafter in conjunction with the drawings and embodiments.

For ease of understanding, some terms involved in the embodiments of the present disclosure will be described hereinafter.

Random access: the random access includes contention-based random access and non-contention-based random access.

A contention-based random access process mainly includes four processes, i.e., random access preamble (i.e., Msg1), random access response (i.e., Msg2), scheduled transmission (i.e., Msg3) and contention resolution (i.e., Msg4).

Figure 1:
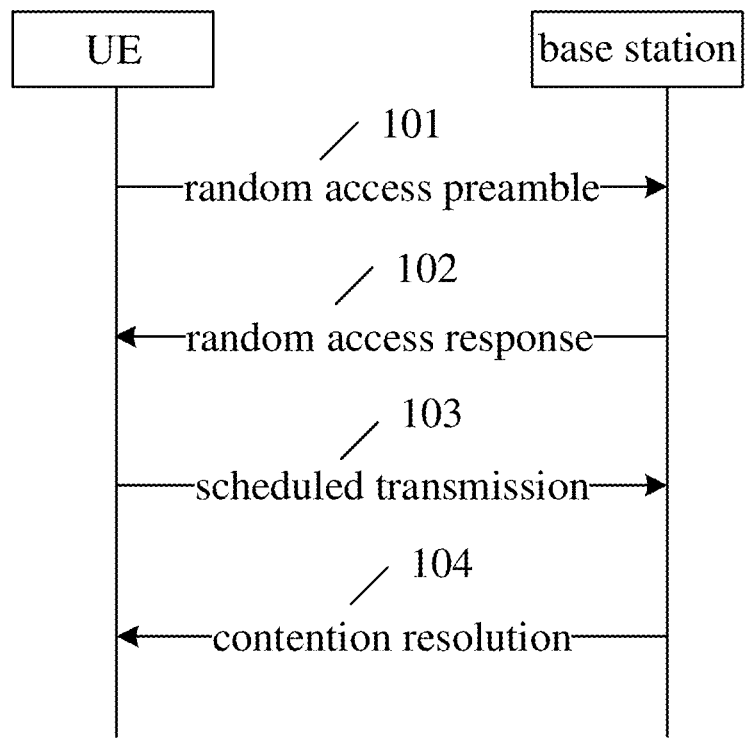
FIG. 1 is a flow chart of a contention-based random access process according to an embodiment of the present disclosure.

As shown in FIG. 1, the contention-based random access process mainly includes Steps 101 to 104.

Step 101: transmitting, by a UE, the random access preamble to a base station.

To be specific, in Step 101, the Msg1 is transmitted by the UE to the base station. The UE selects the random access preamble (i.e., Preamble) and a random access resource, i.e., a Physical Random Access Channel (PRACH) resource, and transmit the selected the random access preamble to the base station on the selected PRACH resource.

Step 102: transmitting, by the base station, the random access response to the UE.

To be specific, in Step 102, the Msg2 is transmitted by the base station to the UE. Upon the receipt of the random access request Msg1, the base station transmit the random access response to the UE, and the random access response carries an uplink timing advance, an Uplink (UL) resource allocated for the Msg3 (i.e., UL Grant) and a temporary Cell Radio Network Temporary Identity (C-RNTI) allocated at a network side. In addition, a Physical Downlink Shared Channel (PDCCH) carrying an Msg2 scheduling message is scrambled using a Random Access Radio Network Temporary Identity (RA-RNTI). The Msg2 further carries a preamble ID, and the UE determines that the Msg2 corresponds to the Msg1 transmitted by the UE itself in accordance with the RA-RNTI and the preamble ID.

Step 103: performing, by the UE, the scheduled transmission.

To be specific, in Step 103, the Msg3 is transmitted by the UE to the base station. The UE performs the uplink transmission on the UL grant allocated through the Msg2. Depending on different random access causes, contents transmitted through the Msg3 in the uplink transmission are different. For example, for initial access, a Radio Resource Control (RRC) connection establishment request is transmitted through the Msg3.

Step 104: transmitting, by the base station, the contention resolution to the UE.

To be specific, in Step 104, the Msg4 is transmitted by the base station to the UE. The UE determines whether the random access has been performed successfully in accordance with the Msg4. For the initial access of the UE, the temporary C-RNTI is automatically converted into a unique UE identity C-RNTI of the UE in a cell, i.e., a C-RNTI, after the contention resolution has been performed successfully.

A non-contention-based random access process mainly includes three processes, i.e., random access preamble assignment (i.e., Msg0), random access preamble (i.e., Msg1), and random access response (Msg2).

Figure 2:
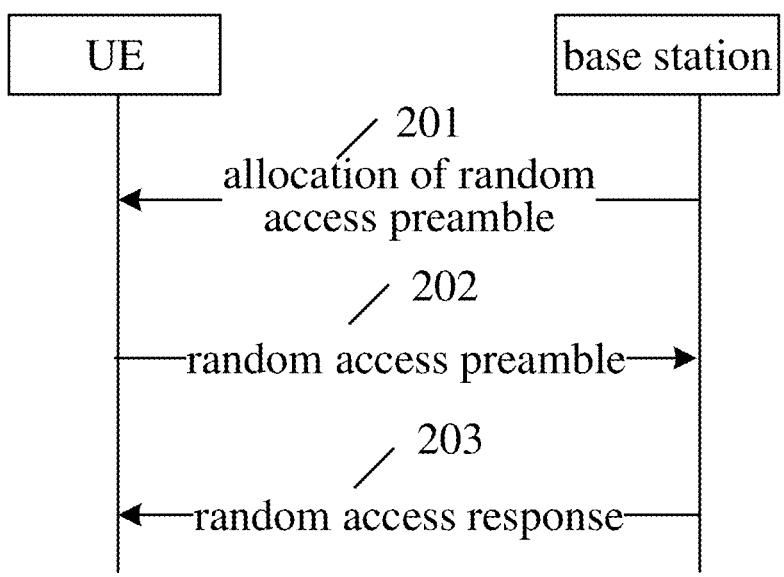
FIG. 2 is a flow chart of a non-contention-based random access process according to an embodiment of the present disclosure.

As shown in FIG. 2, the non-contention-based random access process mainly includes Steps 201 to 203.

Step 201: allocating, by the base station, the random access preamble for the UE.

To be specific, in Step 201, the Msg0 is transmitted by the base station to the UE. The base station allocates for the UE a dedicated preamble for the non-contention-based random access and the PRACH resource for the random access.

Step 202: transmitting, by the UE, the random access preamble random to the base station.

To be specific, in Step 202, the Msg1 is transmitted by the UE to the base station. The UE transmits a designated preamble to the base station on a dedicated PRACH resource in accordance with the Msg0, and upon the receipt of the Msg1, the base station calculates the uplink Timing Advance (TA) in accordance with the Msg1.

Step 203: transmitting, by the base station, the random access response to the UE.

To be specific, in Step 203, the Msg2 is transmitted by the base station to the UE.

It should be appreciated that, in most of random access scenarios, a format of the random access response is the same as that in a contention-based random access scenario, and a Media Access Control Random Access Response Protocol Data Unit (MAC RAR PDU) is scheduled using a PDCCH carrying an RA-RNTI. The MAC RAR PDU includes a Random Access Preamble Identification (RAPID), a Timing Advance Command (TAC), and a UL grant allocated for subsequent uplink transmission resources. The contention resolution is performed by the UE when the RAPID in the MAC RAR PDU is the same as the preamble transmitted through the Msg1. In addition, a new non-contention-based random access scenario, i.e., BFR, has been introduced into an NR. In this scenario, the Msg2 is a PDCCH carrying a C-RNTI. The UE determines that the random access, and thereby the BFR, has been performed successfully as long as the C-RNTI is the same as a C-RNTI of the UE.

To be specific, the non-contention-based random access for the BFR may include: configuring, by a network side device, a candidate beam set for the UE, and allocating, by a network side device, non-contention-based access resources (e.g., PRACH resources and/or preamble) on a plurality of beams in the candidate beam set; when there is a non-contention-based random access resource on the beam selected by the UE, initiating, by a network side device, the non-contention random access; and after the transmission of the Msg1 by the UE, when a PDCCH command scrambled with the C-RNTI of the UE has been received in a configured Control Resource Set (CORESET) for receiving the PDCCH command within a configured time period, determining, by a network side device, that the non-contention-based random access has been performed successfully. With respect to the non-contention-based random access for the BFR, independent random access parameters, including a length of a random access response window (i.e., RA-Response Window-BFR), preamble initial received target power (i.e., Preamble Initial Received Target Power-BFR), a power ramping step (i.e., Power Ramping Step-BFR) and a maximum quantity of random access processes (i.e., Preamble TransMax-BFR), are configured by the base station.

To be specific, the contention-based random access for the BFR may include, when each beam in the candidate beam set does not meet a channel quality condition, initiating, by the UE, the contention-based random access on another beam with better channel quality for the BFR. The contention-based random access process may be the same as another contention-based random access process in a connected state. Random access-related parameters may be the same as those in the other random access process, and the random access-related parameters may include a length of a random access response window (i.e., RA-Response Window), preamble initial received target power, a power ramping step, a maximum quantity of random access processes (i.e., Preamble TransMax), and the like.

When the UE selects the non-contention-based random access for the BFR and one random access process fails, the UE may continue to initiate a next random access process attempt on the beam until the BFR has been performed successfully, or may determine that the BFR fails after the times of the non-contention-based random access processes for the BFR reach a maximum value. Hence, when the beam with relatively low quality is initially selected by the UE, a waste of a large quantity of random access resources may easily occur. An object of the present disclosure is to provide a BFR method, so as to perform the BFR using the contention-based random access in the case that the non-contention-based random access fails during the BFR process, thereby to select the other beam with better channel quality to initiate the contention-based random access in the case that the beam initially selected has low quality, and thus reduce the waste of the random access resource.

Figure 3:
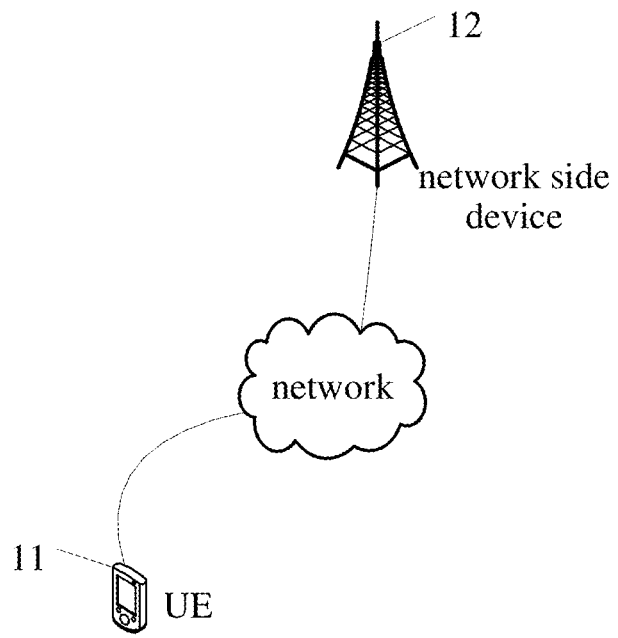
FIG. 3 is a structure schematic view showing an applicable network according to an embodiment of the present disclosure.

FIG. 3 is a structure schematic view showing an applicable network according to an embodiment of the present disclosure. As shown in FIG. 3, the network includes a UE 11 and a network side device 12. The UE 11 may be a mobile phone, a Tablet Personal Computer, a Laptop Computer, a Personal Digital Assistant (PDA), a Mobile Internet Device (MID) or a Wearable Device. It should be appreciated that, a specific type of the UE 11 will not be particularly defined herein. The network side device 12 may be a base station, e.g., a macro base station, a Long Term Evolution (LTE) evolved Node B (eNB) or a 5G NR Node B (NB), or a micro base station, e.g., a Low Power Node (LPN) pico base station or a femto base station, or an Access Point (AP). In addition, the base station may also be a network node consisting of a Central Unit (CU) and a plurality of Transmission Reception Points (TRPs) managed and controlled by the CU. It should be appreciated that, a specific type of the network side device 12 will not be particularly defined herein.

Figure 4:
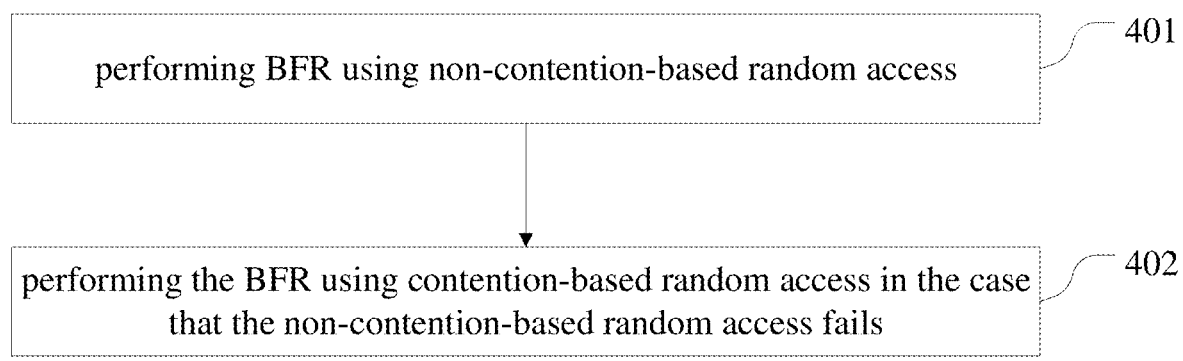
FIG. 4 is a flow chart of a BFR method according to an embodiment of the present disclosure.

As shown in FIG. 4, which is a flow chart of a BFR method according to an embodiment of the present disclosure, the BFR method includes Steps 401 and 402.

Step 401: performing BFR using non-contention-based random access.

In the embodiments of the present disclosure, when the UE determines through measurement that channel quality of a beam on which a UE is currently operating is relatively low and it is necessary to initiate a BFR process, the UE may perform the BFR using the non-contention-based random access, so as to find a beam whose channel quality meets a requirement.

In this step, the performing, by the UE, the BFR using the non-contention-based random access may include: selecting, by the UE, a beam from a plurality of beams in a candidate beam set for which non-contention-based access resources have been allocated, so as to initiate the non-contention-based random access. In the case that the UE has received, within a configured time period, a PDCCH command scrambled with a C-RNTI of the UE in a configured CORESET for receiving the PDCCH command after the transmission of an Msg1 by the UE, the non-contention-based random access may be deemed to be performed successfully. In the case that the UE fails to receive, within the configured time period, the PDCCH command scrambled with the C-RNTI of the UE in the configured CORESET for receiving the PDCCH command, the non-contention-based random access may be deemed to be performed unsuccessfully.

Step 402: performing the BFR using contention-based random access in the case that the non-contention-based random access fails.

In the embodiments of the present disclosure, in the case that the non-contention-based random access fails, the UE may perform the BFR by using the contention-based random access instead, so as to select the other beam with better channel quality.

To be specific, the UE may initiate the contention-based random access on the other beam with better channel quality, so as to perform the BFR. When the contention-based random access fails, the UE may continue to initiate the contention-based random access, until the contention-based random access has been performed successfully or the quantity of random access processes reaches a maximum quantity of random access processes. An MAC layer of the UE may report a notification to a high layer, so as to initiate radio link failure and/or radio link reestablishment.

It should be appreciated that, the contention-based random access process for the BFR may be the same as the other contention-based random access in a connected state, which will not be particularly defined herein.

In the embodiments of the present disclosure, in the case that the BFR is performed using the non-contention-based random access process and the non-contention-based random access fails, the UE may perform the BFR using the contention-based random access. As a result, it is able to select another beam with better channel quality to initiate the contention-based random access when the quality of a beam initially selected by the UE is relatively low, thereby to reduce a waste of random access resources, increase a success rate of the BFR, prevent the BFR from being performed unsuccessfully due to the inappropriate initial beam, and thus reduce the overhead and prevent the occurrence of data loss when the UE is reconnected to a network caused by the BFR being performed unsuccessfully.

In a possible embodiment of the present disclosure, the performing the BFR using the contention-based random access in the case that the non-contention-based random access fails may include: detecting channel quality of a beam for which a non-contention-based random access resource for the BFR has been configured in the case that the non-contention-based random access fails; and when the channel quality of the beam for which the non-contention-based random access resource for the BFR has been configured is smaller than a predetermined threshold, performing the BFR using the contention-based random access.

In the embodiments of the present disclosure, during the BFR process using the non-contention-based random access, prior to initiate the non-contention-based random access each time, the channel quality of the beam in the candidate beam set for which the non-contention-based access resource for the BFR has been configured may be detected and evaluated. When the channel quality of the beam in the candidate beam set for which the non-contention-based access resource for the BFR has been configured is greater than or equal to the predetermined threshold, the UE initiate the non-contention-based random access, so as to perform the BFR. When the channel quality of the beam in the candidate beam set for which the non-contention-based access resource for the BFR has been configured is smaller than the predetermined threshold, the UE may select the other beam with better channel quality to initiate the contention-based random access, so as to perform the BFR.

To be specific, in the case that the non-contention-based random access fails, the channel quality of the beam in the candidate beam set for which the non-contention-based access resource for the BFR has been configured may be detected and evaluated, and when the channel quality of the beam in the candidate beam set for which the non-contention-based access resource for the BFR has been configured is smaller than the predetermined threshold, the BFR may be performed using the contention-based random access. When there is a beam whose the channel quality is greater than or equal to the predetermined threshold in the candidate beam set for which the non-contention-based access resource for the BFR has been configured, the UE may continue to initiate the non-contention-based random access. For example, the UE may select a beam whose channel quality is greater than or equal to the predetermined threshold in the candidate beam set to initiate the non-contention-based random access. It should be appreciated that, the predetermined threshold may be set appropriately according to the practical need.

According to the embodiments of the present disclosure, the channel quality of the beam for which the non-contention-based random access resource for the BFR has been configured may be detected, and when the channel quality of the beam for which the non-contention-based random access resource for the BFR has been configured is smaller than the predetermined threshold, the BFR may be performed using the contention-based random access. As a result, it is able for the UE to select the beam with better channel quality to initiate the contention-based random access, thereby to reduce the waste of the random access resource, increase the success rate of the BFR, reduce the time for recovering the random access, and improve the data transmission stability.

In a possible embodiment of the present disclosure, Msg1 initial received target power of the contention-based random access for the BFR may be Msg1 initial received target power preconfigured for the contention-based random access, and/or an Msg1 power ramping step of the contention-based random access for the BFR may be an Msg1 power ramping step preconfigured for the contention-based random access.

In the embodiments of the present disclosure, the Msg1 initial received target power (i.e., Preamble Initial Received Target Power) and the Msg1 power ramping step (i.e., Power Ramping Step) of the contention-based random access for the BFR may be the same as the Msg1 initial received target power and the Msg1 power ramping step preconfigured for the conventional contention-based random access respectively. To be specific, a network side device may configure such parameters as the Msg1 initial received target power and the Msg1 power ramping step for the contention-based random access for the UE in advance. Prior to the initiation of the contention-based random access by the UE, the UE may acquire such parameters as the Msg1 initial received target power and the Msg1 power ramping step. It should be appreciated that, the contention-based random access may include the contention-based random access for the BFR and the other contention-based random access.

It should be appreciated that, the UE may initiate the contention-based random access on a selected beam, and in the contention-based random access that is initiated for the first time, the Msg1 may be transmitted using the initial received target power (i.e., Preamble Initial Received Target Power). When the current contention-based random access fails and the next contention-based random access is initiated on the beam, transmission power of the Msg1 may be a sum of the initial received target power and the power ramping step, and so on. In other words, the transmission power of the Msg1 for the currently initiated contention-based random access may be a sum of the transmission power of the Msg1 for the last initiated contention-based random access and the power ramping step.

In the embodiments of the present disclosure, the contention-based random access for the BFR may be performed using the Msg1 initial received target power and/or the Msg1 power ramping step preconfigured for the contention-based random access, so as to reduce the configuration of the parameters for the contention-based random access, and simplify a system.

In a possible embodiment of the present disclosure, the maximum quantity of random access processes for determining that the BFR fails may include one of a maximum quantity of random access processes configured for the non-contention-based random access for the BFR, a maximum quantity of random access processes configured for the contention-based random access, a smaller one of the maximum quantity of random access processes configured for the non-contention-based random access for the BFR and the maximum quantity of random access processes configured for the contention-based random access, and a larger one of the maximum quantity of random access processes configured for the non-contention-based random access for the BFR and the maximum quantity of random access processes configured for the contention-based random access.

In the embodiments of the present disclosure, the maximum quantity of random access processes may be used for determining a BFR failure, i.e., when the quantity of random access processes initiated by the UE reaches the maximum quantity of random access processes and the random access still fails, the UE may determine that the BFR fails, and transmit a notification to the high layer. At this time, the UE may initiate the radio link failure and/or radio link reestablishment.

To be specific, the network side device may pre-configure for the UE the maximum quantity of random access processes (i.e., Preamble TransMax-BFR) for the non-contention-based random access for the BFR and the maximum quantity of random access processes (i.e., Preamble TransMax) for the contention-based random access. It should be appreciated that, the contention-based random access may include the contention-based random access for the BFR and the other contention-based random access.

In the embodiments of the present disclosure, the maximum quantity of random access processes for determining that the BFR fails may be the maximum quantity of random access processes configured to the non-contention-based random access for the BFR, the maximum quantity of random access processes configured for the contention-based random access, the smaller one of the maximum quantity of random access processes configured for the non-contention-based random access for the BFR and the maximum quantity of random access processes configured for the contention-based random access, or the larger one of the maximum quantity of random access processes configured for the non-contention-based random access for the BFR and the maximum quantity of random access processes configured for the contention-based random access. In a possible embodiment of the present disclosure, the maximum quantity of random access processes for determining that the BFR fails may be pre-agreed in a protocol.

It should be appreciated that, the maximum quantity of random access processes configured for the non-contention-based random access for the BFR and the maximum quantity of random access processes configured for the contention-based random access may be preconfigured by the network side device. In other words, the maximum quantity of random access processes for determining that the BFR fails may be a maximum quantity of random access processes preconfigured for the non-contention-based random access for the BFR, or a maximum quantity of random access processes preconfigured for the contention-based random access, a smaller one of the maximum quantity of random access processes preconfigured for the non-contention-based random access for the BFR and the maximum quantity of random access processes preconfigured for the contention-based random access, or a larger one of the maximum quantity of random access processes preconfigured for the non-contention-based random access for the BFR and the maximum quantity of random access processes preconfigured for the contention-based random access.

In the embodiments of the present disclosure, through using the maximum quantity of random access processes configured for the non-contention-based random access for the BFR, the maximum quantity of random access processes configured for the contention-based random access, the smaller one of the maximum quantity of random access processes configured for the non-contention-based random access for the BFR and the maximum quantity of random access processes configured for the contention-based random access, or the larger one of the maximum quantity of random access processes configured for the non-contention-based random access for the BFR and the maximum quantity of random access processes configured for the contention-based random access as the maximum quantity of random access processes for determining that the BFR fails, it is able to reduce the configuration of the parameters for the contention-based random access, thereby to simplify the system.

In a possible embodiment of the present disclosure, during the procedure of performing the BFR using the contention-based random access, the quantity of random access processes for initial contention-based random access may be recorded as 1; or during the procedure of performing the BFR using the contention-based random access, the quantity of random access processes for the initial contention-based random access may be recorded as a value acquired through incrementing the quantity of non-contention-based random access processes for the BFR before the contention-based random access by one.

In the embodiments of the present disclosure, after the UE has been switched from the non-contention-based random access to the contention-based random access, the quantity of random access processes may be reset to an initial value, i.e., 0, and then increment the value in accordance with the quantity of random access processes for initiating the contention-based random access. In a possible embodiment of the present disclosure, after the UE has been switched from the non-contention-based random access to the contention-based random access, the quantity of random access processes may also be continued to be incremented on the basis of the quantity of random access processes for the non-contention-based random access that was initiated previously.

To be specific, when the UE has been switched from the non-contention-based random access to the contention-based random access and the quantity of random access processes is reset to the initial value, during the procedure of performing the BFR using the contention-based random access, the quantity of random access processes for initial contention-based random access may be recorded as 1, and it may be incremented by one each time a subsequent new contention-based random access is initiated.

When the UE has been switched from the non-contention-based random access to the contention-based random access and the quantity of random access processes is continued to be incremented on the basis of the quantity of random access processes for the non-contention-based random access that was initiated previously, during the procedure of performing the BFR using the contention-based random access, the quantity of random access processes for the initial contention-based random access may be recorded as a value acquired through incrementing by one the quantity of non-contention-based random access processes for the BFR before the contention-based random access, and the quantity of random access processes may be incremented by one each time a subsequent new contention-based random access is initiated. For example, when the quantity M of non-contention-based random access processes have already been initiated by the UE before the UE is switched from the non-contention-based random access to the contention-based random access, the quantity of random access processes for the initial contention-based random access may be M+1, and the quantity of random access processes may be a value acquired through incrementing the quantity of random access processes for the contention-based random access that was last initiated by one each time a subsequent new contention-based random access is initiated.

In a possible embodiment of the present disclosure, during the procedure of performing the BFR using the contention-based random access, when current contention-based random access fails and a backoff indicator has been received, the BFR method may further include omitting the backoff indicator and re-initiating the contention-based random access on a latest random access resource; or during the procedure of performing the BFR using the contention-based random access, when the current contention-based random access fails and the backoff indicator has been received, the BFR method may further include re-initiating the contention-based random access after waiting for a period corresponding to the backoff indicator.

It should be appreciated that, the time corresponding to the backoff indicator may be a backoff value randomly selected between 0 and a backoff parameter indicated by the backoff indicator in accordance with average distribution, and the UE may delay the transmission of the next random access in accordance with the selected backoff value.

In the embodiments of the present disclosure, during the procedure of performing the BFR using the contention-based random access, when the Backoff Indicator (BI) in the Msg2 has been received by the UE and the current random access fails, the UE may omit the backoff indicator and immediately initiate the random access on the latest random access resource, so as to perform the BFR as soon as possible and ensure the reliable data transmission. In a possible embodiment of the present disclosure, when the backoff indicator in the Msg2 has been received by the UE and the current random access fails, the UE may also delay the initiation of the new random access in accordance with the time corresponding to the backoff indicator, so as to reduce the burden of the network side device.

It should be appreciated that, various possible implementation modes described in the embodiments of the present disclosure may be implemented in a combined manner or separately, which will not be particularly defined herein.

The present disclosure will be described hereinafter in conjunction with the specific embodiments.

First Embodiment: after the BFR is performed by the UE unsuccessfully using the non-contention-based random access, the UE may perform the BFR using the contention-based random access. In this embodiment, the BFR method may include the following steps.

Step a1: the UE may select a non-contention-based random access resource to initiate the random access, so as to perform the BFR.

In this step, when the current random access fails, i.e., when the UE fails to receive a PDCCH command carrying a C-RNTI of the UE within a configured Msg2 reception window (i.e., an RA-Response Window-BFR) and on a configured PDCCH reception resource (i.e., CORESET) after the transmission of the Msg1 by the UE, the UE may perform Step a2, and when the current random access is performed successfully, the UE may determine that the BFR has been performed successfully.

Step a2: the UE may detect and evaluate channel quality of a beam for which the non-contention-based random access resource for the BFR has been configured.

In this step, when the channel quality of all the beams for which the non-contention-based random access resource for the BFR has been configured is smaller than the predetermined threshold, the UE may select the other beam with better channel quality to initiate the contention-based random access, i.e., perform Step a3.

Step a3: the UE may initiate the contention-based random access on the selected beam in accordance with parameters of the contention-based random access.

In this step, the parameters of the contention-based random access may include Msg1 initial received target power, an Msg1 power ramping step and the maximum quantity of random access processes. To be specific, the Msg1 initial received target power may be Msg1 initial received target power (i.e., Msg1 initial transmission power) for the common contention-based random access, and the Msg1 power ramping step may be an Msg1 power ramping step for the common contention-based random access. Each time the random access attempt fails, the transmission power for the current contention-based random access may be equal to a sum of the Msg1 transmission power for the previous contention-based random access and the power ramping step.

It should be appreciated that, the contention-based random access process for the BFR may be the same as the other contention-based random access process in a connected state, which will not be particularly defined herein.

Second Embodiment: after the BFR is performed by the UE unsuccessfully using the non-contention-based random access, the UE may perform the BFR using the contention-based random access, and determine whether the BFR fails in accordance with the maximum quantity of random access processes configured for the non-contention-based random access for the BFR. To be specific, the BFR method may include the following steps.

Step b1: the UE may attempt to perform the BFR using the non-contention-based random access for M times, and then perform the BFR using the contention-based random access.

In this step, during the BFR procedure using the non-contention-based random access, each time the non-contention-based random access fails, the UE may detect and evaluate the channel quality of the beam for which the non-contention-based random access resource for the BFR has been configured. When the non-contention-based random access has been initiated for M times and it is detected that the channel quality of all the beams for which the non-contention-based random access resource for the BFR has been configured is smaller than the predetermined threshold, the UE may perform the BFR using the contention-based random access.

Step b2: the UE may initiate the contention-based random access on the selected beam, and the quantity of the random access processes may be set as M+1. When the current contention-based random access fails, the UE may continue to initiate the contention-based random access, and the quantity of the random access processes may be incremented, until the quantity of random access processes reaches the maximum quantity of random access processes configured by the network side device for the non-contention-based random access for the BFR (i.e., Preamble TransMax-BFR) or the random access has been performed successfully.

Step b3: when the quantity of random access processes reaches the maximum quantity (i.e., Preamble TransMax-BFR) and the random access still fails, an MAC layer of the UE may report it to a high layer, so as to initiate a radio link failure and/or radio link reestablishment.

Third Embodiment: after the BFR is performed by the UE unsuccessfully using the non-contention-based random access, the UE may perform the BFR using the contention-based random access, and determine whether the BFR fails in accordance with the smaller one of the maximum quantity of random access processes configured for the non-contention-based random access for the BFR and the maximum quantity of random access processes configured for the contention-based random access. To be specific, the BFR method may include the following steps.

Step c1: the UE may attempt to perform the BFR using the non-contention-based random access for M times, and then perform the BFR using the contention-based random access.

This step may the same as Step b1, and thus will not be particularly defined hereinafter.

Step c2: the UE may initiate the contention-based random access on the selected beam, and the quantity of the random access processes may be set as M+1. When the current contention-based random access fails, the UE may continue to initiate the contention-based random access, and the quantity of the random access processes may be continued to be incremented, until the quantity of random access processes reaches the smaller one of the maximum quantity of random access processes configured by the network side device for the non-contention-based random access for the BFR (i.e., Preamble TransMax-BFR) and the maximum quantity of random access processes configured for the contention-based random access (i.e., Preamble TransMax) or the random access has been performed successfully.

Step c3: when the quantity of random access processes reaches the upper limit (i.e., min (Preamble TransMax-BFR, Preamble TransMax)) and the random access still fails, the MAC layer of the UE may report it to the high layer, so as to initiate the radio link failure and/or radio link reestablishment.

Fourth Embodiment: after the BFR is performed by the UE unsuccessfully using the non-contention-based random access, the UE may perform the BFR using the contention-based random access, and determine whether the BFR fails in accordance with the larger one of the maximum quantity of random access processes configured for the non-contention-based random access for the BFR and the maximum quantity of random access processes configured for the contention-based random access. To be specific, the BFR method may include the following steps.

Step d1: the UE may attempt to perform the BFR using the non-contention-based random access for M times, and then perform the BFR using the contention-based random access.

This step may the same as Step b1, and thus will not be particularly defined hereinafter.

Step d2: the UE may initiate the contention-based random access on the selected beam, and the quantity of the random access processes may be set as M+1. When the current contention-based random access fails, the UE may continue to initiate the contention-based random access, and the quantity of the random access processes may be continued to be incremented, until the quantity of random access processes reaches the larger one of the maximum quantity of random access processes configured by the network side device for the non-contention-based random access for the BFR (i.e., Preamble TransMax-BFR) and the maximum quantity of random access processes configured for the contention-based random access (i.e., Preamble TransMax) or the random access has been performed successfully.

Step d3: when the quantity of random access processes reaches the upper limit (i.e., max (Preamble TransMax-BFR, Preamble TransMax)) and the random access still fails, the MAC layer of the UE may report it to the high layer, so as to initiate the radio link failure and/or radio link reestablishment.

Fifth Embodiment: after the BFR is performed unsuccessfully using the non-contention-based random access, the UE may perform the BFR using the contention-based random access and determine whether the BFR fails in accordance with the maximum quantity of contention-based random access processes. The quantity of random access processes configured for the contention-based random access for the BFR may be incremented on the basis of the quantity of random access processes for the previous non-contention-based random access for the BFR. To be specific, the BFR method may include the following steps.

Step e1: the UE may attempt to perform the BFR using the non-contention-based random access for M times, and then perform the BFR using the contention-based random access.

This step may the same as Step b1, and thus will not be particularly defined hereinafter.

Step e2: the UE may initiate the contention-based random access on the selected beam, and the quantity of the random access processes may be set as M+1. When the current contention-based random access fails, the UE may continue to initiate the contention-based random access, and the quantity of the random access processes may be incremented, until the quantity of random access processes reaches the maximum quantity of random access processes configured by the network side device for the contention-based random access (i.e., Preamble TransMax) or the random access has been performed successfully.

Step e3: when the quantity of random access processes reaches the maximum quantity (i.e., Preamble TransMax) and the random access still fails, the MAC layer of the UE may report it to the high layer, so as to initiate the radio link failure and/or radio link reestablishment.

Sixth Embodiment: after the BFR is performed unsuccessfully using the non-contention-based random access, the UE may perform the BFR using the contention-based random access, and determine whether the BFR fails in accordance with the maximum quantity of random access processes for the contention-based random access. The quantity of random access processes for the contention-based random access for the BFR may be increment from the initial value (e.g., 0). To be specific, the BFR method may include the following steps.

Step f1: the UE may attempts to perform the BFR using the non-contention-based random access for M times, and then perform the BFR using the contention-based random access.

This step may the same as Step b1, and thus will not be particularly defined hereinafter.

Step f2: the UE may initiate the contention-based random access on the selected beam, and the quantity of the random access processes may be set as 1. When the current contention-based random access fails, the UE may continue to initiate the contention-based random access, and the quantity of the random access processes may be incremented, until the quantity of random access processes reaches the maximum quantity of random access processes configured by the network side device for the contention-based random access (i.e., Preamble TransMax) or the random access has been performed successfully.

Step f3: when the quantity of random access processes reaches the maximum quantity (i.e., Preamble TransMax) and the random access still fails, the MAC layer of the UE may report it to the high layer, so as to initiate the radio link failure and/or radio link reestablishment.

Seventh Embodiment: after the BFR is performed by the UE unsuccessfully using the non-contention-based random access, the UE may perform the BFR using the contention-based random access, and the backoff indicator in the Msg2 may be omitted in the contention-based random access.

Step g1: after the BFR is performed by the UE unsuccessfully using the non-contention-based random access, the UE may perform the BFR using the contention-based random access, and receive a BI parameter in the Msg2.

Step g2: when the current random access fails and the UE determines that a cause for initiating the random access is the BFR, the UE may omit the backoff indicator and immediately re-initiate the random access on the latest random access resource.

In this step, when the backoff indicator is omitted, it means that the UE may not delay the re-initiation of the random access in accordance with the backoff indicator.

Eighth Embodiment: after the BFR is performed by the UE unsuccessfully using the non-contention-based random access, the UE may perform the BFR using the contention-based random access, and the backoff indicator in the Msg2 may be followed in the contention-based random access.

Step h1: after the BFR is performed by the UE unsuccessfully using the non-contention-based random access, the UE may perform the BFR using the contention-based random access, and receive the BI parameter in the Msg2.

Step g2: when the current random access fails, the UE may delay the re-initiation of the new random access in accordance with a time corresponding to the backoff indicator.

In a word, according to the BFR method in the embodiments of the present disclosure, it is able for the UE to perform the BFR as soon as possible, thereby to prevent the occurrence of the BFR failure and the waste of random access resources due to the inappropriate initial beam, and reduce the overhead and prevent the occurrence of data loss when the UE is reconnected to a network caused by the BFR failure.

It should be appreciated that, behaviors and parameters of the network side device may corresponding to the behaviors and parameters of the UE described hereinabove. For example, when the UE performs the BFR using the noncontention-based random access, the network side device may perform a corresponding operation with respect to the non-contention-based random access initiated by the UE. For example, upon the receipt of the Msg1 from the UE, the network side device may transmit the Msg2 to the UE. When the BFR is performed by the UE unsuccessfully using the non-contention-based random access and the UE performs the BFR using the contention-based random access, the network side device may perform a corresponding operation with respect to the contention-based random access initiated by the UE. For example, upon the receipt of the Msg1 from the UE, the network side device may transmit the Msg2 to the UE, and upon the receipt of the Msg3 from the UE, the network side device may transmit the Msg4 to the UE.

Figure 5:
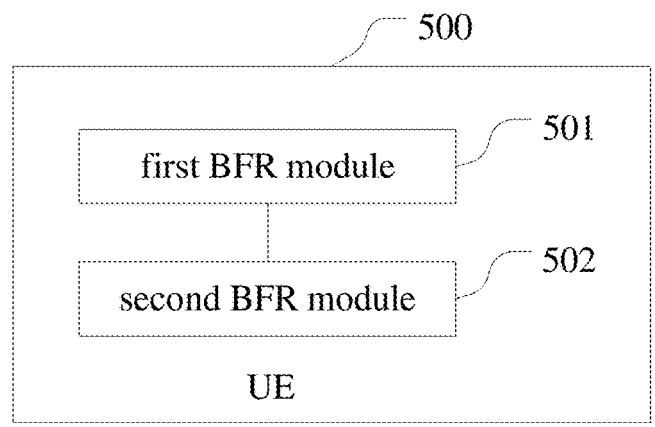
FIG. 5 is a structure schematic view showing a UE according to an embodiment of the present disclosure.

As shown in FIG. 5, the present disclosure further provides in some embodiments a UE 500 which includes: a first BFR module 501 configured to perform BFR using non-contention-based random access; and a second BFR module 502 configured to perform the BFR using contention-based random access in the case that the non-contention-based random access fails.

Figure 6:
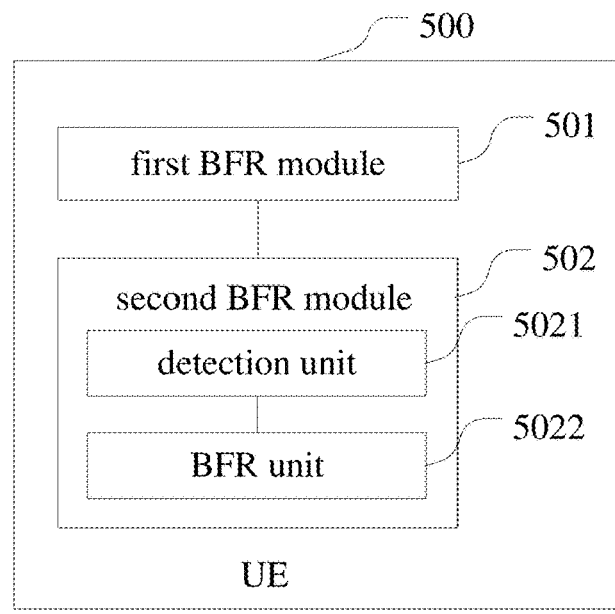
FIG. 6 is a structure schematic view showing another UE according to an embodiment of the present disclosure.

In a possible embodiment of the present disclosure, as shown in FIG. 6, the second BFR module 502 may include: a detection unit 5021 configured to detect channel quality of a beam for which a non-contention-based random access resource for the BFR has been configured in the case that the non-contention-based random access fails; and a BFR unit 5022 configured to, when the channel quality of the beam for which the non-contention-based random access resource for the BFR has been configured is smaller than a predetermined threshold, perform the BFR using the contention-based random access.

In a possible embodiment of the present disclosure, Msg1 initial received target power of the contention-based random access for the BFR may be Msg1 initial received target power preconfigured for the contention-based random access, and/or an Msg1 power ramping step of the contention-based random access for the BFR may be an Msg1 power ramping step preconfigured for the contention-based random access.

In a possible embodiment of the present disclosure, a maximum quantity of random access processes for determining that the BFR fails may include one of a maximum quantity of random access processes configured for the non-contention-based random access for the BFR, a maximum quantity of random access processes configured for the contention-based random access, a smaller one of the maximum quantity of random access processes configured for the non-contention-based random access for the BFR and the maximum quantity of random access processes configured for the contention-based random access, and a larger one of the maximum quantity of random access processes configured for the non-contention-based random access for the BFR and the maximum quantity of random access processes configured for the contention-based random access.

In a possible embodiment of the present disclosure, the UE 500 may further include a counting module configured to: during the procedure of performing the BFR using the contention-based random access, record the quantity of random access processes for initial contention-based random access as 1; or during the procedure of performing the BFR using the contention-based random access, record the quantity of random access processes for the initial contention-based random access as a value acquired through incrementing the quantity of non-contention-based random access processes for the BFR before the contention-based random access by one.

In a possible embodiment of the present disclosure, the second BFR module 502 is further configured to: during the procedure of performing the BFR using the contention-based random access, when current contention-based random access fails and a backoff indicator has been received, omit the backoff indicator and re-initiate the contention-based random access on a latest random access resource; or during the procedure of performing the BFR using the contention-based random access, when the current contention-based random access fails and the backoff indicator has been received, re-initiate the contention-based random access after waiting for a period corresponding to the backoff indicator.

It should be appreciated that, the UE 500 may be the UE mentioned in the above method embodiment, and any implementation modes of the UE in the method embodiment may be implemented by the UE 500 with a same beneficial effect, which will not be particularly defined herein.

Figure 7:
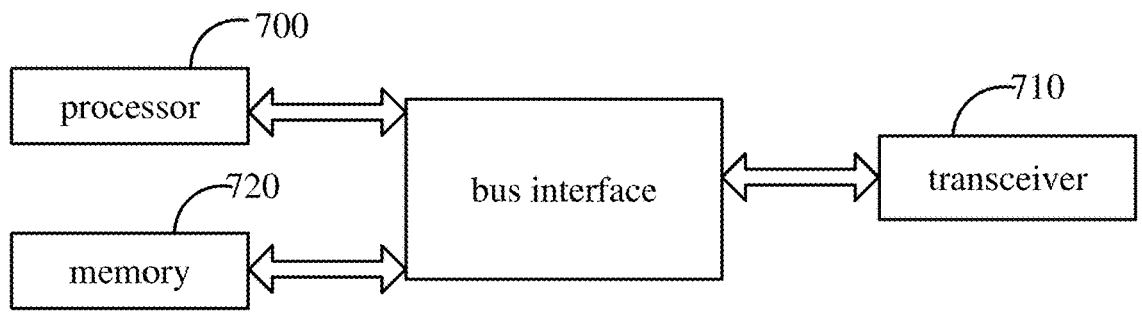
FIG. 7 is a structure schematic view showing yet another UE according to an embodiment of the present disclosure.

As shown in FIG. 7, the present disclosure further provides in some embodiments a UE which includes a transceiver 710, a memory 720, a processor 700, and a program stored in the memory 720 and capable of being executed by the processor. The transceiver is configured to: perform BFR using non-contention-based random access; and perform the BFR using contention-based random access in the case that the non-contention-based random access fails. The transceiver 710 is further configured to receive and transmit data under the control of the processor 700.

In FIG. 7, bus architecture may include a number of buses and bridges connected to each other, so as to connect various circuits for one or more processors such as the processor 700 and one or more memories such as the memory 720. In addition, as is known in the art, the bus architecture may be used to connect various other circuits, such as a circuit for a peripheral device, a circuit for a voltage stabilizer and a power management circuit, which will be not particularly defined herein. A bus interface may be provided, and the transceiver 710 may consist of a plurality of elements, i.e., a transmitter and a receiver for communication with various other devices over a transmission medium.

The processor 700 may take charge of managing the bus architecture as well as general processings. The memory 720 may store therein data for the operation of the processor 700.

It should be appreciated that, the memory 720 may not be limited to be provided on the UE; instead, the memory 720 and the processor 700 may be located at different geographical positions.

In a possible embodiment of the present disclosure, the processor 700 is configured to read the program stored in the memory, so as to detect channel quality of a beam for which a non-contention-based random access resource for the BFR has been configured in the case that the non-contention-based random access fails, and the transceiver 710 is further configured to, when the channel quality of the beam for which the non-contention-based random access resource for the BFR has been configured is smaller than a predetermined threshold, perform the BFR using the contention-based random access.

In a possible embodiment of the present disclosure, Msg1 initial received target power of the contention-based random access for the BFR may be Msg1 initial received target power preconfigured for the contention-based random access, and/or an Msg1 power ramping step of the contention-based random access for the BFR may be an Msg1 power ramping step preconfigured for the contention-based random access.

In a possible embodiment of the present disclosure, a maximum quantity of random access processes for determining that the BFR fails may include one of a maximum quantity of random access processes configured for the non-contention-based random access for the BFR, a maximum quantity of random access processes configured for the contention-based random access, a smaller one of the maximum quantity of random access processes configured for the non-contention-based random access for the BFR and the maximum quantity of random access processes configured for the contention-based random access, and a larger one of the maximum quantity of random access processes configured for the non-contention-based random access for the BFR and the maximum quantity of random access processes configured for the contention-based random access.

In a possible embodiment of the present disclosure, during the procedure of performing the BFR using the contention-based random access, the quantity of random access processes for initial contention-based random access may be recorded as 1; or during the procedure of performing the BFR using the contention-based random access, the quantity of random access processes for the initial contention-based random access may be recorded as a value acquired through incrementing the quantity of non-contention-based random access processes for the BFR before the contention-based random access by one.

In a possible embodiment of the present disclosure, the transceiver 710 is further configured to: during the procedure of performing the BFR using the contention-based random access, when current contention-based random access fails and a backoff indicator has been received, omit the backoff indicator and re-initiate the contention-based random access on a latest random access resource; or during the procedure of performing the BFR using the contention-based random access, when the current contention-based random access fails and the backoff indicator has been received, re-initiate the contention-based random access after waiting for a period corresponding to the backoff indicator.

It should be appreciated that, the UE may be that mentioned in the above method embodiment, and any implementation modes of the UE in the method embodiment may be implemented by the UE with a same beneficial effect, which will not be particularly defined herein.

The present disclosure further provides in some embodiments a computer-readable storage medium storing therein a program. The program is executed by a processor so as to implement the above-mentioned BFR method.

It should be further appreciated that, the device and method may be implemented in other ways. For example, the device embodiments described above are merely illustrative. For example, the division of the units is only a logical function division, and there may be other divisions in actual implementation, for example, multiple units or components may be combined or they can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

In addition, the functional units in the embodiments of the present disclosure may be integrated into a processing unit, or the functional units may physically exist independently, or two or more units may be integrated into one unit. The above-mentioned integrated unit can be realized in the form of hardware, or in the form of hardware plus software functional unit.

The software functional units implemented in a software form may be stored in a computer-readable medium. These software functional units may be stored in a storage medium and include instructions so as to enable a computer device (e.g., a personal computer, a server or network device) to execute parts of the steps of the method according to the embodiments of the present disclosure. The storage medium includes various medium capable of storing therein program codes, e.g., a universal serial bus flash disk, a mobile hard disk, a Read-Only Memory (ROM), a Random Access Memory (RAM), a magnetic disk or an optical disk.

The above are optional implementations of the present disclosure. It should be appreciated that a person skilled in the art may make further modifications and improvements without departing from the principle of the present disclosure, and these modifications and improvements shall also fall within the scope of the present disclosure.

What is claimed is:

1. A Beam Failure Recovery (BFR) method, comprising:
   performing BFR using non-contention-based random access;
   performing the BFR using contention-based random access in the case that the non-contention-based random access fails,
   wherein the performing the BFR using the contention-based random access in the case that the non-contention-based random access fails comprises:
   detecting channel quality of a beam for which a non-contention-based random access resource for the BFR has been configured in the case that the non-contention-based random access fails;
   when the channel quality of the beam for which the non-contention-based random access resource for the BFR has been configured is smaller than a predetermined threshold, performing the BFR using the contention-based random access, and wherein a preamble initial received target power of the contention-based random access for the BFR is preconfigured for the contention-based random access; and a power ramping step of the contention-based random access for the BFR is preconfigured for the contention-based random access.

2. The BFR method according to claim 1, wherein a maximum quantity of random access processes for determining that the BFR fails is one of:
   a maximum quantity of random access processes configured for the non-contention-based random access for the BFR;
   a maximum quantity of random access processes configured for the contention-based random access;
   a smaller one of the maximum quantity of random access processes configured for the non-contention-based random access for the BFR and the maximum quantity of random access processes configured for the contention-based random access;
   a larger one of the maximum quantity of random access processes configured for the non-contention-based random access for the BFR and the maximum quantity of random access processes configured for the contention-based random access.

3. The BFR method according to claim 1, wherein during the procedure of performing the BFR using the contention-based random access, the quantity of random access processes for initial contention-based random access is recorded as 1; or during the procedure of performing the BFR using the contention-based random access, the quantity of random access processes for the initial contention-based random access is recorded as a value acquired through incrementing by one the quantity of non-contention-based random access processes for the BFR before the contention-based random access.

4. The beam failure recover method according to claim 1, wherein during the procedure of performing the BFR using the contention-based random access, when current contention-based random access fails and a backoff indicator has been received, the backoff indicator is omitted and the contention-based random access on a latest random access resource is re-initiated; or during the procedure of performing the BFR using the contention-based random access, when the current contention-based random access fails and the backoff indicator has been received, the contention-based random access is re-initiated after waiting for a period corresponding to the backoff indicator.

5. The BFR method according to claim 1, wherein during the procedure of performing the BFR using the contention-based random access, the quantity of random access processes for initial contention-based random access is recorded as 1; or during the procedure of performing the BFR using the contention-based random access, the quantity of random access processes for the initial contention-based random access is recorded as a value acquired through incrementing by one the quantity of non-contention-based random access processes for the BFR before the contention-based random access.

6. The BFR method according to claim 1, wherein during the procedure of performing the BFR using the contention-based random access, when current contention-based random access fails and a backoff indicator has been received, the backoff indicator is omitted and the contention-based random access on a latest random access resource is re-initiated; or during the procedure of performing the BFR using the contention-based random access, when the current contention-based random access fails and the backoff indicator has been received, the contention-based random access is re-initiated after waiting for a period corresponding to the backoff indicator.

7. A UE, comprising a transceiver, a memory, a processor, and a program stored in the memory and capable of being executed by the processor, wherein the transceiver is configured to perform BFR using non-contention-based random access;

the transceiver is further configured to perform the BFR using contention-based random access in the case that the non-contention-based random access fails, wherein the processor is configured to read the program stored in the memory to detect channel quality of a beam for which a non-contention-based random access resource for the BFR has been configured in the case that the non-contention-based random access fails;

the transceiver is further configured to, when the channel quality of the beam for which the non-contention-based random access resource for the BFR has been configured is smaller than a predetermined threshold, perform the BFR using the contention-based random access, and wherein a preamble initial received target power of the contention-based random access for the BFR is preconfigured for the contention-based random access; and a power ramping step of the contention-based random access for the BFR is preconfigured for the contention-based random access.

8. The UE according to claim 7, wherein a maximum quantity of random access processes for determining that the BFR fails is one of:

a maximum quantity of random access processes configured for the non-contention-based random access for the BFR;

a maximum quantity of random access processes configured for the contention-based random access;

a smaller one of the maximum quantity of random access processes configured for the non-contention-based random access for the BFR and the maximum quantity of random access processes configured for the contention-based random access;

a larger one of the maximum quantity of random access processes configured for the non-contention-based random access for the BFR and the maximum quantity of random access processes configured for the contention-based random access.

9. The UE according to claim 7, wherein during the procedure of performing the BFR using the contention-based random access, the quantity of random access processes for initial contention-based random access is recorded as 1; or during the procedure of performing the BFR using the contention-based random access, the quantity of random access processes for the initial contention-based random access is recorded as a value acquired through incrementing by one the quantity of non-contention-based random access processes for the BFR before the contention-based random access.

10. The UE according to claim 7, wherein the transceiver is further configured to:

during the procedure of performing the BFR using the contention-based random access, when current contention-based random access fails and a backoff indicator has been received, omit the backoff indicator and re-initiate the contention-based random access on a latest random access resource; or during the procedure of performing the BFR using the contention-based random access, when the current contention-based random access fails and the backoff indicator has been received, re-initiate the contention-based random access after waiting for a period corresponding to the backoff indicator.

11. A non-transitory computer-readable storage medium storing therein a program, wherein the program is configured to be executed by a processor to implement steps of a BFR method including:

performing BFR using contention-based random access;

performing the BFR using contention-based random access in the case that the non-contention-based random access fails, wherein the performing the BFR using contention-based random access in the case that the non-contention-based random access fails comprises:

detecting channel quality of a beam for which a non-contention-based random access resource for the BFR has been configured in the case that the non-contention-based random access fails;

when the channel quality of the beam for which the non-contention-based random access resource for the BFR has been configured is smaller than a predetermined threshold, performing the BFR using the contention-based random access, and wherein a preamble initial received target power of the contention-based random access for the BFR is preconfigured for the contention-based random access; and a power ramping step of the contention-based random access for the BFR is preconfigured for the contention-based random access.

12. The non-transitory computer-readable storage medium according to claim 11, wherein a maximum quantity of random access processes for determining that the BFR fails is one of:
   a maximum quantity of random access processes configured for the non-contention-based random access for the BFR;
   a maximum quantity of random access processes configured for the contention-based random access;
   a smaller one of the maximum quantity of random access processes configured for the non-contention-based random access for the BFR and the maximum quantity of random access process configured for the contention-based random access;
   a larger one of the maximum quantity of random access processes configured for the non-contention-based random access for the BFR and the maximum quantity of random access processes configured for the contention-based random access.

13. The non-transitory computer-readable storage medium according to claim 11, wherein
   during the procedure of performing the BFR using the contention-based random access, the quantity of random access processes for initial contention-based random access is recorded as 1; or
   during the procedure of performing the BFR using the contention-based random access, the quantity of random access processes for the initial contention-based random access is recorded as a value acquired through incrementing by one the quantity of non-contention-based random access processes for the BFR before the contention-based random access.

14. The non-transitory computer-readable storage medium according to claim 11, wherein
   during the procedure of performing the BFR using the contention-based random access, when current contention-based random access fails and a backoff indicator has been received, the backoff indicator is omitted and the contention-based random access on a latest random access resource is re-initiated; or
   during the procedure of performing the BFR using the contention-based random access, when the current contention-based random access fails and the backoff indicator has been received, the contention-based random access is re-initiated after waiting for a period corresponding to the backoff indicator.

* * * * *